(12) United States Patent
Kusano et al.

(10) Patent No.: US 6,641,233 B2
(45) Date of Patent: Nov. 4, 2003

(54) HYDRAULIC BRAKE APPARATUS FOR A VEHICLE

(75) Inventors: Akihito Kusano, Toyota (JP); Satoshi Ishida, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/092,495

(22) Filed: Mar. 8, 2002

(65) Prior Publication Data

US 2002/0140283 A1 Oct. 3, 2002

(30) Foreign Application Priority Data

Mar. 8, 2001 (JP) ........................................ 2001-065569

(51) Int. Cl.[7] ................................................. B60T 8/64
(52) U.S. Cl. ........................ 303/152; 303/3; 303/113.5; 303/119.1
(58) Field of Search ........................ 303/152, 3, 113.5, 303/119.1, 115.2, 13, 114.1, 113.4; 60/547.1, 581, 593

(56) References Cited

U.S. PATENT DOCUMENTS

| | | | |
|---|---|---|---|
| 4,126,996 A | 11/1978 | Leiber | |
| 5,716,108 A | * 2/1998 | Asa et al. | 303/3 |
| 5,882,093 A | * 3/1999 | Enomoto et al. | 303/152 |
| 5,967,621 A | * 10/1999 | Ito et al. | 303/15 |
| 6,070,953 A | 6/2000 | Miyago | |
| 6,070,954 A | * 6/2000 | Urababa et al. | 303/152 |
| 6,132,015 A | * 10/2000 | Aoyama | 303/152 |
| 6,439,674 B1 | * 8/2002 | Niino | 303/152 |
| 6,454,364 B1 | * 9/2002 | Niwa et al. | 303/152 |
| 6,467,267 B2 | * 10/2002 | Kanazawa et al. | 60/552 |

* cited by examiner

Primary Examiner—Jack Lavinder
Assistant Examiner—Benjamin A Pezzlo
(74) Attorney, Agent, or Firm—Burns, Doane, Swecker & Mathis, LLP

(57) ABSTRACT

A hydraulic brake apparatus for a vehicle includes a hydraulic pressure generator which generates and outputs a power pressure irrespective of brake pedal operation, a regulation valve which regulates the power pressure to a predetermined pressure corresponding to the brake pedal operation force and outputs the predetermined pressure, and a master cylinder having a master cylinder pressure chamber and an auxiliary pressure chamber connectable to an output side of the regulation valve. The master cylinder is operated by auxiliary pressure in the auxiliary pressure chamber to generate a master cylinder pressure corresponding to the auxiliary pressure. A wheel brake cylinder is operated by the master cylinder pressure to apply braking force to a wheel. A pressure modulation device is disposed in a pressure passage connecting the output side of the regulation valve to the auxiliary pressure chamber to modulate the auxiliary pressure to a pressure less than the predetermined.

19 Claims, 2 Drawing Sheets

HYDRAULIC BRAKE APPARATUS FOR A VEHICLE

This application is based on and claims priority under 35 U.S.C. §119 with respect to Japanese Patent Application 2001-065569 filed on Mar. 8, 2001, the entire content of which is incorporated herein by reference.

FIELD OF THE INVENTION

This invention generally relates to a vehicle brake apparatus. More particularly, this invention pertains to a hydraulic brake apparatus suitable for an electric vehicle to perform regenerative braking.

BACKGROUND OF THE INVENTION

A known hydraulic brake apparatus for a vehicle is disclosed in U.S. Pat. No. 4,126,996 published on Nov. 28, 1978. This brake apparatus includes a hydraulic pressure generator for generating a power pressure irrespective of operation of a brake pedal and outputting the power pressure. A regulation valve regulates the power pressure outputted from the hydraulic pressure generator to a pressure corresponding to the operation force applied to the brake pedal and outputs the pressure. A master cylinder is provided with a master cylinder pressure chamber and an auxiliary pressure chamber connected to the output side of the regulation valve. The master cylinder is operated by an auxiliary pressure in the auxiliary pressure chamber to generate a master cylinder pressure corresponding to the auxiliary pressure in the master cylinder pressure chamber. A wheel brake cylinder is operated by the master cylinder pressure to apply a braking force to a wheel. In this hydraulic brake apparatus, the operation (depression) force of the brake pedal which is necessary for applying a certain braking force to the wheel is relatively small.

In the case of an electric vehicle performing regenerative braking, the braking force by regenerative braking takes precedence over the braking force by the hydraulic pressure in the wheel cylinder. Further, the braking force associated with regenerative braking varies by factors such as the charging condition of the battery and the vehicle speed. Thus, it is necessary to modulate the hydraulic pressure in the wheel cylinder to be less than the pressure corresponding to the operation force of the brake pedal or the braking force required by a driver through a relatively simple and not excessively expensive construction.

However, in the known hydraulic brake apparatus, because the auxiliary pressure chamber communicates with the output side of the regulation valve, the auxiliary pressure in the auxiliary pressure chamber is equal to the pressure outputted from the regulation valve corresponding to the operation force of the brake pedal. For that reason, the master cylinder pressure corresponding to the operation force of the brake pedal is supplied to the wheel cylinder. Thus, if the known apparatus is applied to an electric vehicle which performs regenerative braking, a braking force greater than that required by the driver is applied to the wheel by the regenerative braking force.

A need thus exists for a vehicle hydraulic brake apparatus which is not as susceptible to the drawbacks mentioned above.

SUMMARY OF THE INVENTION

According to one aspect, a hydraulic brake apparatus for a vehicle includes a hydraulic pressure generator which generates a power pressure irrespective of brake pedal operation and outputs the power pressure, a regulation valve which regulates the power pressure outputted from the hydraulic pressure generator to a predetermined pressure corresponding to the brake pedal operation force and outputs the predetermined pressure, and a master cylinder having an auxiliary pressure chamber which is connectable to an output side of the regulation valve and a master cylinder pressure chamber. The master cylinder is operated by an auxiliary pressure in the auxiliary pressure chamber to generate a master cylinder pressure corresponding to the auxiliary pressure in the auxiliary pressure chamber. A wheel brake cylinder is operated by the master cylinder pressure to apply a braking force to a wheel. Further, a pressure modulation device is disposed in a pressure passage connecting the output side of the regulation valve to the auxiliary pressure chamber to modulate the auxiliary pressure to a pressure less than the predetermined pressure outputted from the regulation valve.

According to another aspect, a hydraulic brake apparatus for a vehicle includes a hydraulic pressure generator which generates a power pressure irrespective of operation of a brake pedal and outputs the power pressure, a regulation valve which regulates the power pressure outputted from the hydraulic pressure generator to a predetermined pressure corresponding to an operation force of the brake pedal and outputs the predetermined pressure, and a master cylinder having a first master cylinder pressure chamber and an auxiliary pressure chamber which is connectable to an output side of the regulation valve. The master cylinder is operated by an auxiliary pressure in the auxiliary pressure chamber to generate a master cylinder pressure corresponding to the auxiliary pressure in the auxiliary pressure chamber. A first wheel brake cylinder is operated by the master cylinder pressure to apply braking force to a wheel of the vehicle. A pressure modulating means modulates the auxiliary pressure to a pressure less than the predetermined pressure outputted from the regulation valve.

According to a further aspect, a hydraulic brake apparatus for a vehicle includes a pump for generating a power pressure irrespective of operation of a brake pedal, a regulation valve connected to the pump to regulate the power pressure outputted from the pump to a predetermined pressure corresponding to an operation force of the brake pedal, and a master cylinder having an auxiliary pressure chamber which is connectable to an output side of the regulation valve and a first master cylinder pressure chamber, with the master cylinder being operated by an auxiliary pressure in the auxiliary pressure chamber to generate a master cylinder pressure corresponding to the auxiliary pressure in the auxiliary pressure chamber. A first wheel brake cylinder receives the master cylinder pressure to apply a braking force to a wheel of the vehicle. A first valve is located in a pressure passage connecting the regulation valve to the auxiliary pressure chamber, and a second valve is located in a pressure passage connecting the auxiliary pressure chamber to a reservoir. In addition, a control device controls the first and second valves to modulate the auxiliary pressure to a pressure less than the predetermined pressure outputted from the regulation valve.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
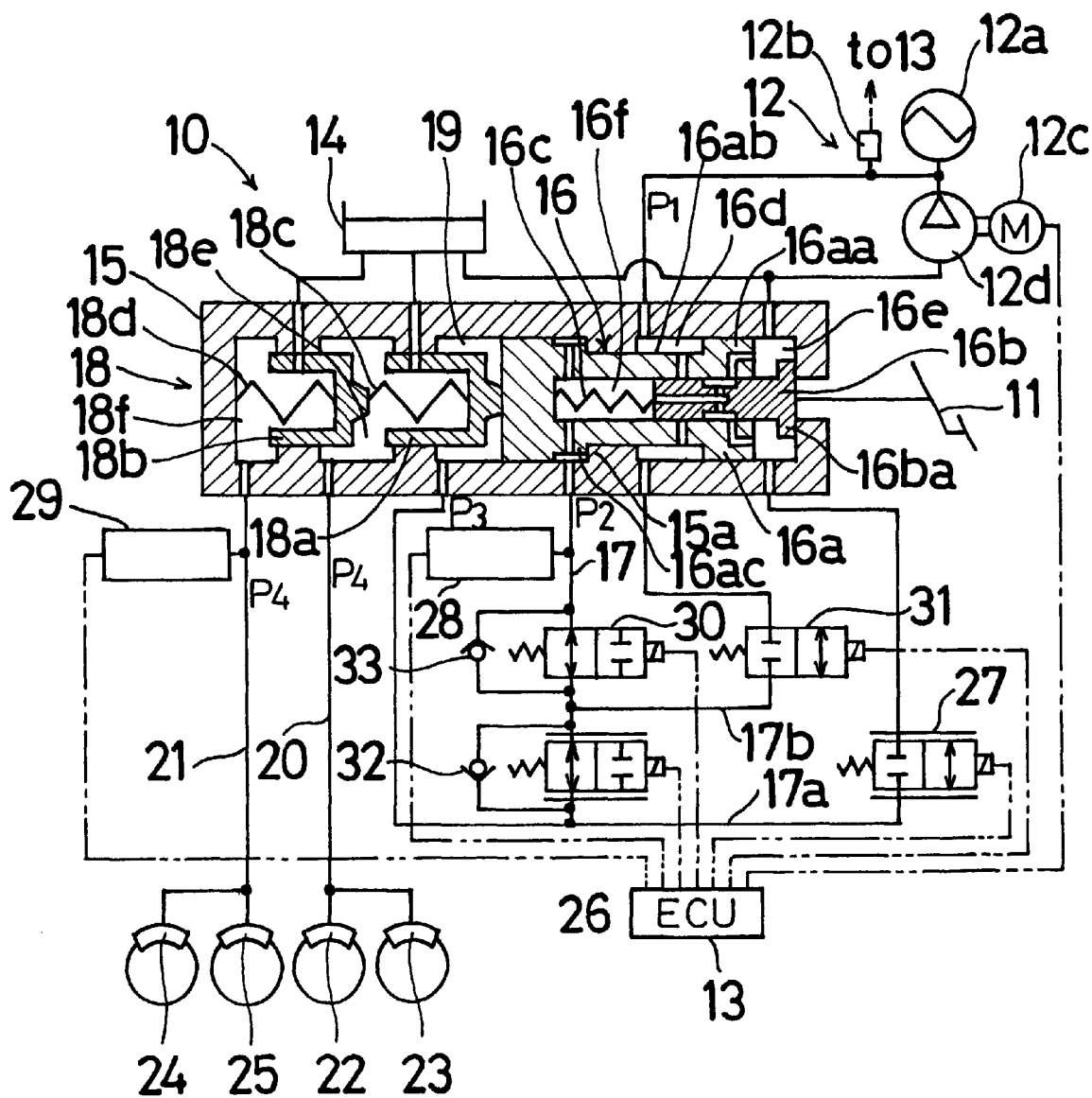
FIG. 1 is a schematic illustration of a hydraulic brake apparatus for a vehicle according to one embodiment of the present invention.

FIG. 1 illustrates a hydraulic brake apparatus 10 for an electric vehicle according to one embodiment in which the front wheels are driven. In FIG. 1, the hydraulic brake apparatus 10 includes a hydraulic pressure generator 12 serving as a power pressure source for generating a predetermined power pressure P1 irrespective of operation of a brake pedal 11. The hydraulic pressure generator 12 outputs the power pressure P1. The hydraulic pressure generator 12 includes an accumulator 12a, a pressure sensor 12b, a DC electric motor 12c and a hydraulic pump 12d. The accumulator 12a accumulates hydraulic fluid in the pressurized condition and the pressure sensor 12b detects the pressure P1 accumulated in the accumulator 12a. The pressure sensor 12b outputs a signal to an electronic control device (hereinafter referred to as an ECU) 13 indicative of the detected pressure. The motor 12c is driven and controlled by the ECU 13 in response to the output of the pressure sensor 12b to drive or operate the pump 12d. The pump 12d draws or sucks in hydraulic fluid from a reservoir 14 and pressurizes the fluid to supply pressurized hydraulic fluid to the accumulator 12a. The motor 12c is controlled so that the pressure P1 in the accumulator 12a is maintained between a lower limit value and an upper limit value.

The power pressure P1 outputted from the hydraulic pressure generator 12 is supplied to a regulation valve 16. The regulation valve 16 is accommodated in one side or end portion (i.e., the right side portion in the illustrated embodiment) of a fixed cylinder 15. The regulation valve 16 is a so-called spool valve and includes a valve body 16a, a valve spool 16b and a return spring 16c. The valve body 16a is slidably disposed in a stepped cylinder bore of the cylinder 15 and the valve spool 16b is slidably disposed in an inner bore of the valve body 16a. The valve spool 16b is connected to the brake pedal 11. The return spring 16c biases or urges the valve spool 16b in the rightward direction relative to the valve body 16a. The power pressure P1 of the hydraulic pressure generator 12 is supplied to a circular high-pressure chamber 16d. The high-pressure chamber 16d is formed in the cylinder 15 by a right side larger diameter portion 16aa of the valve body 16a and a smaller diameter portion 16ab adjacent the larger diameter portion 16aa. A low-pressure chamber 16e is also formed in the cylinder 15 between the right side larger diameter portion 16aa of the valve body 16a and the right end of the cylinder 15. The low-pressure chamber 16e communicates with the reservoir 14. Thus, the valve body 15 is normally kept at the position shown in FIG. 1 by the pressure difference between the high-pressure chamber 16d and the low-pressure chamber 16e. The valve body 16a also possesses a stepped portion 16ac which contacts a stepped portion 15a of the cylinder 15 to prevent the valve body 16a from moving in the right direction beyond the initial position shown in FIG. 1.

An output pressure chamber 16f is formed between the valve spool 16b and the valve body 16a. The output pressure chamber 16f is separated from the high pressure chamber 16b and communicates with the low pressure chamber 16e when the valve spool 16b contacts the right end portion of the cylinder 15 as shown in FIG. 1 (i.e., when the brake pedal is not operated). If the brake pedal is operated and the valve spool 16b is moved leftward from the position shown in FIG. 1, the output pressure chamber 16f is separated from the low pressure chamber 16e and communicates with the high pressure chamber 16b. The valve spool 16b is pushed in the rightward direction by the return spring 16c and the hydraulic pressure P2 in the output pressure chamber 16f while the valve spool 16b is pushed in the left direction by the operating force of the brake pedal 11.

Thus, the regulation valve 16 regulates the hydraulic pressure P1 outputted from the hydraulic pressure generator 12 to the hydraulic pressure P2 corresponding to the operating force of the brake pedal 11 and outputs the hydraulic pressure P2 to a pressure passage 17. Assuming that the hydraulic pressure P1 is not outputted from the hydraulic pressure generator 12 because of a failure of the hydraulic pressure generator 12, when the brake pedal 11 is operated, a flange portion 16ba of the valve spool 16b engages the valve body 16a so that the valve body 16a is moved in the left direction.

A master cylinder 18 is constructed or constituted by the left side portion of the cylinder 15. The master cylinder 18 includes a first piston 18a, a second piston 18b, a first return spring 18c and a second return spring 18d. The first and second pistons 18a, 18b are slidably disposed in the inner bore of the cylinder 15. The first and second return springs 18c, 18d bias the first and second pistons 18a, 18b toward the regulation valve 16 (i.e., in the right direction in FIG. 1) to return the first and second pistons 18a, 18b to the initial position shown in FIG. 1.

A first master cylinder pressure chamber 18e is formed between the first and second pistons 18a, 18b, and a second master cylinder pressure chamber 18f is formed between the second piston 18b and the left end of the cylinder 15. Further, an auxiliary pressure chamber 19 is formed between the valve body 16a of the regulation valve 16 and the first piston 18a. The auxiliary pressure chamber 19 is connectable to the output pressure chamber 16f (an output side) of the regulation valve 16 via the pressure passage. The master cylinder pressure chambers 18e, 18f are communicated with the reservoir 14 and are under a low pressure when the pistons 18a, 18b are positioned in the initial position shown in FIG. 1. If the pistons 18a, 18b are moved in the leftward direction by an auxiliary hydraulic pressure P3 in the auxiliary pressure chamber 19 or the valve body 16a, the master cylinder pressure chambers 18e, 18f are separated from the reservoir 14 and then generate master cylinder pressure P4.

The first master cylinder pressure chambers 18e is connected to rear wheel cylinders 22, 23 via a hydraulic pressure passage 20 and the second master cylinder pressure chambers 18f is connected to front wheel cylinders 24, 25 via a hydraulic pressure passage 21. The rear wheel cylinder 22 is operated by the master cylinder pressure P4 and applies a braking force corresponding to the pressure P4 to the rear left wheel. The rear wheel cylinder 23 is operated by the master cylinder pressure P4 and applies a braking force corresponding to the pressure P4 to the rear right wheel. The front wheel cylinder 24 is operated by the master cylinder pressure P4 and applies a braking force corresponding to the pressure P4 to the front left wheel. The front wheel cylinder 25 is operated by the master cylinder pressure P4 and applies a braking force corresponding to the pressure P4 to the front right wheel.

A normally-open proportioning solenoid valve 26 is disposed in the hydraulic pressure passage 17 connecting the output side of the regulation valve 16 to the auxiliary pressure chamber 19. A normally closed proportioning solenoid valve 27 is disposed in a diverging pressure passage 17a connecting the hydraulic pressure passage 17 to the low-pressure chamber 16e. The proportioning solenoid valve 26 is constructed such that the pressure difference between the input side (i.e., the upper side in FIG. 1) and the output side (i.e., the lower side in FIG. 1) is increased as the current supplied to a solenoid thereof is increased by the ECU 13. The proportioning solenoid valve 27 is constructed such that the pressure difference between the input side (i.e., the lower side in FIG. 1) and the output side (i.e., the upper side in FIG. 1) is increased as the current supplied to a solenoid thereof is decreased by the ECU 13. The proportioning solenoid valve 26 is a pressure-increase control valve for controlling the pressure increase in the auxiliary pressure chamber 19 when the brake pedal is operated during braking of the vehicle. The proportioning solenoid valve 27 is a pressure-decrease control valve for controlling the pressure decrease in the auxiliary pressure chamber 19 when the brake pedal is operated during braking of the vehicle. These proportioning solenoid valves 26, 27 constitute a pressure modulation valve device for modulating the auxiliary hydraulic pressure P3 in the auxiliary pressure chamber 19 to an appropriate pressure value less than the output pressure P2 of the regulation valve 16.

To modulate the auxiliary hydraulic pressure P3 in the auxiliary pressure chamber 19 to an appropriate pressure, the proportioning solenoid valve 26 may be replaced by a normally-open opening/closing solenoid valve and the proportioning solenoid valve 27 may be replaced by a normally-closed opening/closing solenoid valve. In this case, these opening and closing solenoid valves are duty-controlled. However, considering the operational noise of the valves during modulation of the auxiliary pressure P3 in the auxiliary pressure chamber 19, it is desirable that proportioning solenoid valves be used.

A pressure sensor 28 is connected to the pressure passage 17 and a pressure sensor 29 is connected to the pressure passage 21. The pressure sensor 28 senses the output pressure P2 of the regulation valve 16 which corresponds to the braking force required by a driver of the vehicle. The pressure sensor 29 senses the master cylinder pressure P4 which corresponds to the braking force applied by the wheel cylinders 22–25 to the wheels. The outputs of these pressure sensors 28, 29 are inputted to the ECU 13. The ECU 13 receives the information relating to the degree of regenerative braking force from an electronic control device for driving/regenerative control. Then, the ECU 13 controls the proportioning solenoid valves 26, 27 such that the brake force difference in which the regenerative braking force is subtracted from the braking force required by the driver coincides with the braking force corresponding to the braking pressure in the wheel cylinders. The regenerative braking force is changed by various factors such as the charging condition of the battery and the vehicle speed. Thus, it is desirable that the auxiliary pressure P3 in the auxiliary pressure chamber 19 can be increased/decreased and modulated to the appropriate pressure.

A normally open opening/closing solenoid valve 30 is disposed in the pressure passage 17 between the regulation valve 16 and the proportioning solenoid valve 26. A normally closed opening/closing solenoid valve 31 is disposed in a diverging pressure passage 17b connecting the pressure passage 17 at a point between the opening/closing solenoid valve 30 and the proportioning solenoid valve 26 to the high-pressure chamber 16d. With these opening/closing solenoid valves 30, 31, the so-called automatic braking operation can be executed. For example, the braking force can be applied to the wheels by the wheel cylinders 22–25 even if the brake pedal 11 is not operated and a braking force larger than that corresponding to the depressing force of the brake pedal 11 can be applied to the wheels during operation of the brake pedal 11. These solenoid valves 30, 31 are driven and controlled by the ECU 13. Known information necessary to execute the automatic braking operation is inputted from various sensors to the ECU 13. If the automatic braking operation is executed, the solenoid valve 30 is closed and the solenoid valve 31 is opened by the ECU 13. As a result, the output pressure P1 of the hydraulic pressure generator 12 is supplied to the input side of the proportioning solenoid valve 26 and the flow of hydraulic pressure from the input side of the proportioning solenoid valve 26 to the regulation valve 16 is prevented. The auxiliary pressure P3 in the auxiliary pressure chamber 19 is modulated by controlling the proportioning solenoid valves 26, 27. The solenoid valves 30, 31 constitute a switching valve device or changeover valve device for selectively communicating the proportioning solenoid valve 26 (pressure-increase control valve) with either one of the regulation valve 16 and the hydraulic pressure generator 12. The solenoid valves 30, 31 may be replaced by a three-port two-position solenoid valve having a first port connected to the output side of the regulation valve 16, a second port connected to the input side of the proportioning solenoid valve 26 and a third port connected to the output side of the hydraulic pressure generator 12.

A check valve 32 is connected to the pressure passage 17 such that it bypasses the proportioning solenoid valve 26. The check valve 32 permits flow from the output side of the proportioning solenoid valve 26 to the input side of the proportioning solenoid valve 26 while preventing the reverse flow. A check valve 33 is connected to the pressure passage 17 such that it bypasses the opening/closing solenoid valve 30. The check valve 33 permits flow from the input side of the opening/closing solenoid valve 30 to the output side of the opening/closing solenoid valve 30 while preventing the reverse flow. These check valves 32, 33 are provided for dealing with, for example, failure of the solenoid valves 26, 30.

In a hydraulic brake apparatus in which automatic braking control is not necessary, the opening/closing solenoid valves 30, 31 and the check valve 33 may be omitted.

In the embodiment shown in FIG. 1, the piston 18b, the return spring 18d, the master cylinder pressure chamber 18f and the pressure passage 21 may be omitted and the front wheel cylinders 24, 25 may be connected to the pressure passage 20.

Figure 2:
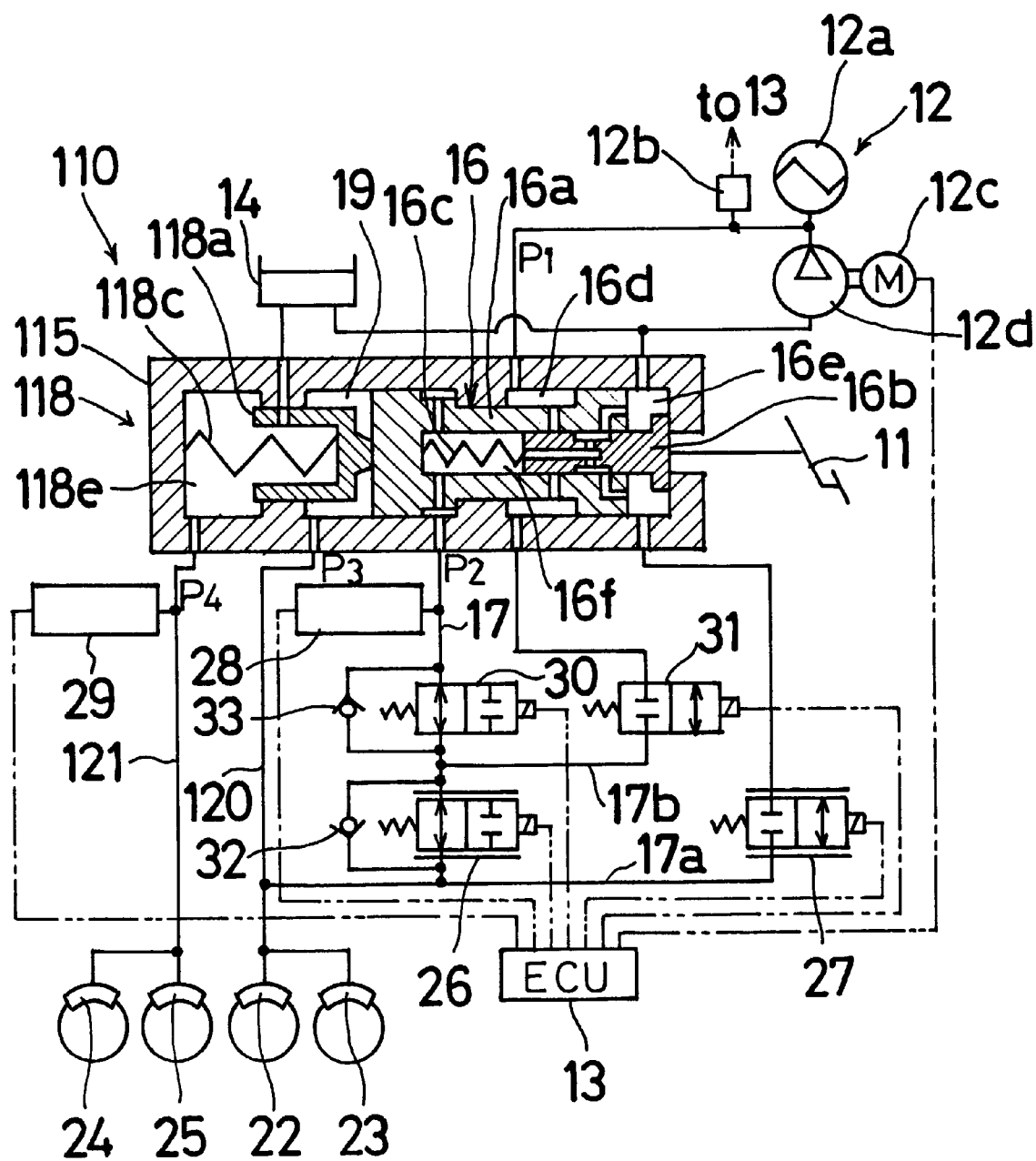
FIG. 2 is a schematic illustration of a hydraulic brake apparatus for a vehicle according to another embodiment of the present invention.

FIG. 2 illustrates a hydraulic brake apparatus 110 for an electric vehicle with driven front wheels according to a second embodiment. In FIG. 2, features that are the same as and correspond to features in the embodiment shown in FIG. 2 are identified with the same reference numerals. The hydraulic brake apparatus 110 shown in FIG. 2 differs from the hydraulic brake apparatus 10 of the first embodiment in the following manner: The hydraulic brake apparatus 110 includes a master cylinder 118 which only has one master cylinder piston 118a, one return spring 118c and one master cylinder pressure chamber 118e. Further, the rear wheel cylinders 22, 23 are connected to the auxiliary pressure chamber 19 via a passage 120 and the front wheel cylinders 24, 25 are connected to the master cylinder piston 118a via a passage 121.

As is apparent from the above explanation, in the embodiments of the vehicle hydraulic brake apparatus, the auxiliary pressure P3 in the auxiliary pressure chamber 19 is modulated to the appropriate pressure by the proportioning solenoid valves 26, 27. As a result, through use of a relatively simple construction, the braking pressure in the wheel cylinders can be modulated in response to changes in the regenerative braking force.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A hydraulic brake apparatus for a vehicle comprising:
    a hydraulic pressure generator which generates a power pressure irrespective of operation of a brake pedal and outputs the power pressure;
    a regulation valve which regulates the power pressure outputted from the hydraulic pressure generator to a predetermined pressure corresponding to an operation force of the brake pedal and outputs the predetermined pressure;
    a master cylinder having a first master cylinder pressure chamber and an auxiliary pressure chamber which is connectable to an output side of the regulation valve, the master cylinder being operated by an auxiliary pressure in the auxiliary pressure chamber to generate a master cylinder pressure corresponding to the auxiliary pressure in the auxiliary pressure chamber;
    a first wheel brake cylinder connected to the master cylinder and operated by the master cylinder pressure to apply braking force to a wheel of the vehicle;
    a pressure passage connecting the output side of the regulation valve to the auxiliary pressure chamber; and
    a pressure modulation device disposed in the pressure passage to modulate the auxiliary pressure to a pressure less than the predetermined pressure outputted from the regulation valve.

2. The hydraulic brake apparatus for a vehicle according to claim 1, wherein the pressure modulation device includes a valve device modulating the auxiliary pressure to a pressure less than the predetermined pressure outputted from the regulation valve.

3. The hydraulic brake apparatus for a vehicle according to claim 2, wherein the valve device includes a pressure-increase control valve and a pressure-decrease control valve, the pressure-increase control valve being disposed in the pressure passage connecting the output side of the regulation valve to the auxiliary pressure chamber and the pressure-decrease control valve being disposed in a pressure passage connecting the auxiliary pressure chamber to a reservoir.

4. The hydraulic brake apparatus for a vehicle according to claim 3, wherein at least one of the pressure-increase control valve and the pressure-decrease control valve is a proportioning solenoid valve.

5. The hydraulic brake apparatus for a vehicle according to claim 3, further comprising a changeover valve device which selectively communicates the pressure-increase control valve with either one of the regulation valve and the hydraulic pressure generator.

6. The hydraulic brake apparatus for a vehicle according to claim 5, wherein the changeover valve device includes a first opening/closing solenoid valve and a second opening/closing solenoid valve, the first solenoid valve being disposed in a pressure passage connecting an input side of the pressure-increase control valve to the output side of the regulation valve and the second solenoid valve being disposed in a pressure passage connecting the input side of the pressure-increase control valve to an output side of the hydraulic pressure generator.

7. The hydraulic brake apparatus for a vehicle according to claim 1, wherein the master cylinder includes a second master cylinder pressure chamber, and further comprising a second wheel cylinder connected to the second master cylinder pressure chamber.

8. The hydraulic brake apparatus for a vehicle according to claim 1, further comprising a second wheel cylinder connected to the auxiliary pressure chamber.

9. A hydraulic brake apparatus for a vehicle comprising:
    a hydraulic pressure generator which generates a power pressure irrespective of operation of a brake pedal and outputs the power pressure;
    a regulation valve which regulates the power pressure outputted from the hydraulic pressure generator to a predetermined pressure corresponding to an operation force of the brake pedal and outputs the predetermined pressure;
    a master cylinder having a first master cylinder pressure chamber and an auxiliary pressure chamber which is connectable to an output side of the regulation valve, the master cylinder being operated by an auxiliary pressure in the auxiliary pressure chamber to generate a master cylinder pressure corresponding to the auxiliary pressure in the auxiliary pressure chamber;
    a first wheel brake cylinder operated by the master cylinder pressure to apply braking force to a wheel of the vehicle; and
    pressure modulating means for modulating the auxiliary pressure to a pressure less than the predetermined pressure outputted from the regulation valve.

10. The hydraulic brake apparatus for a vehicle according to claim 9, wherein the pressure modulating means includes a pressure-increase control valve and a pressure-decrease control valve, the pressure-increase control valve being disposed in a pressure passage connecting the output side of the regulation valve to the auxiliary pressure chamber and the pressure-decrease control valve being disposed in a pressure passage connecting the auxiliary pressure chamber to a reservoir.

11. The hydraulic brake apparatus for a vehicle according to claim 10, further comprising a normally open opening/closing solenoid valve disposed in a pressure passage connecting an input side of the pressure-increase control valve to the output side of the regulation valve, and a normally closed opening/closing solenoid valve disposed in a pressure passage connecting the input side of the pressure-increase control valve to an output side of the hydraulic pressure generator.

12. The hydraulic brake apparatus for a vehicle according to claim 9, wherein the modulating means includes a normally open solenoid valve and a normally closed solenoid valve.

13. The hydraulic brake apparatus for a vehicle according to claim 12, wherein the normally open solenoid valve is disposed in a pressure passage connecting the output side of the regulation valve to the auxiliary pressure chamber, and the normally closed solenoid valve is disposed in a pressure passage connecting the auxiliary pressure chamber to a reservoir.

14. The hydraulic brake apparatus for a vehicle according to claim 9, wherein the master cylinder includes a second master cylinder pressure chamber, and further comprising a second wheel cylinder connected to the second master cylinder pressure chamber.

15. A hydraulic brake apparatus for a vehicle comprising:

a pump for generating a power pressure irrespective of operation of a brake pedal;

a regulation valve connected to the pump to regulate the power pressure outputted from the pump to a predetermined pressure corresponding to an operation force of the brake pedal;

a master cylinder having an auxiliary pressure chamber which is connectable to an output side of the regulation valve and a first master cylinder pressure chamber, the master cylinder being operated by an auxiliary pressure in the auxiliary pressure chamber to generate a master cylinder pressure corresponding to the auxiliary pressure in the auxiliary pressure chamber;

a first wheel brake cylinder receiving the master cylinder pressure to apply braking force to a wheel of the vehicle;

a first valve located in a pressure passage connecting the regulation valve to the auxiliary pressure chamber;

a second valve located in a pressure passage connecting the auxiliary pressure chamber to a reservoir; and a control device which controls the first and second valves to modulate the auxiliary pressure to a pressure less than the predetermined pressure outputted from the regulation valve.

16. The hydraulic brake apparatus for a vehicle according to claim 15, wherein the first valve is a pressure-increase control valve and the second valve is a pressure-decrease control valve.

17. The hydraulic brake apparatus for a vehicle according to claim 15, further comprising a normally open opening/closing solenoid valve disposed in a pressure passage connecting an input side of the first valve to the output side of the regulation valve, and a normally closed opening/closing solenoid valve disposed in a pressure passage connecting the input side of the first valve to an output side of the pump.

18. The hydraulic brake apparatus for a vehicle according to claim 15, wherein the first valve is a normally open solenoid valve and the second valve is a normally closed solenoid valve.

19. The hydraulic brake apparatus for a vehicle according to claim 15, wherein the master cylinder includes a second master cylinder pressure chamber, and further comprising a second wheel cylinder connected to the second master cylinder pressure chamber.

* * * * *